United States Patent
Blaaberg et al.

(10) Patent No.: US 10,437,832 B2
(45) Date of Patent: Oct. 8, 2019

(54) RECONCILING FOREIGN KEY REFERENCES AND TABLE SECURITY POLICIES

(71) Applicant: Microsoft Technology Licensing, LLC, Redmond, WA (US)

(72) Inventors: Lars Dragheim Blaaberg, Karlslunde (DE); Ahmad Mahdi El Husseini, Kirkland, WA (US); Ganapathi Subramanian Sadasivam, Sammamish, WA (US); Michael Gall, Sammamish, WA (US); Jeffrey Anderson, West Fargo, ND (US)

(73) Assignee: Microsoft Technology Licensing, LLC, Remond, WA (US)

( * ) Notice: Subject to any disclaimer, the term of this patent is extended or adjusted under 35 U.S.C. 154(b) by 197 days.

(21) Appl. No.: 15/592,780

(22) Filed: May 11, 2017

(65) Prior Publication Data
US 2017/0337248 A1 Nov. 23, 2017

Related U.S. Application Data

(60) Provisional application No. 62/339,084, filed on May 19, 2016.

(51) Int. Cl.
*G06F 17/30* (2006.01)
*G06F 16/2457* (2019.01)
(Continued)

(52) U.S. Cl.
CPC ........ *G06F 16/24575* (2019.01); *G06F 16/20* (2019.01); *G06F 16/2282* (2019.01); *G06F 16/248* (2019.01); *G06F 16/284* (2019.01)

(58) Field of Classification Search
None
See application file for complete search history.

(56) References Cited

U.S. PATENT DOCUMENTS

| 7,904,530 B2 * | 3/2011 | Partridge | ............ G06F 16/9535 709/217 |
| 8,645,390 B1 * | 2/2014 | Oztekin | .............. G06F 16/9535 707/748 |

(Continued)

FOREIGN PATENT DOCUMENTS

| WO | 01/33427 A2 | 5/2001 |
| WO | 2013/174457 A1 | 11/2013 |

OTHER PUBLICATIONS

Int. Search Report/Written Opinion in PCT Application No. PCT/US2017/033495 dated Jul. 6, 2017, 9 pgs.

*Primary Examiner* — Hung D Le
(74) *Attorney, Agent, or Firm* — Buckely, Maschoff & Talwalkar LLC

(57) ABSTRACT

Some database tables include a relational field, where a record of the table stores a foreign-key reference value that identifies a related record of a second table. While fulfilling a request comprising a query over the database, the system may identify a context of the request, wherein the context is supplemental to the query, and wherein the context relates to the relational field. For example, a security policy may permit a requester to query the first table, but restrict the requester from accessing the second table that the relational field of the first table references, where dereferencing the relational field may cause unexpected results. Instead, the system may evaluate the context of the request, and may fulfill the request based on the context by providing a response that substitutes, for the value that references the second table, a substitute value that does not reference the second table.

20 Claims, 10 Drawing Sheets

(51) Int. Cl.
*G06F 16/248* (2019.01)
*G06F 16/28* (2019.01)
*G06F 16/22* (2019.01)
*G06F 16/20* (2019.01)

(56) References Cited

U.S. PATENT DOCUMENTS

| | | | | |
|---|---|---|---|---|
| 2006/0009692 | A1* | 1/2006 | Fukuda | G06F 19/321 |
| | | | | 600/407 |
| 2007/0136371 | A1* | 6/2007 | Golobay | H04L 41/024 |
| 2009/0094193 | A1 | 4/2009 | King et al. | |
| 2010/0318536 | A1* | 12/2010 | Bandholz | G06F 16/90344 |
| | | | | 707/759 |
| 2012/0096015 | A1* | 4/2012 | Koomullil | G06F 16/3338 |
| | | | | 707/749 |
| 2013/0110804 | A1* | 5/2013 | Davis | G06F 3/017 |
| | | | | 707/706 |
| 2013/0117259 | A1* | 5/2013 | Ackerman | G06F 16/9535 |
| | | | | 707/722 |
| 2015/0242474 | A1* | 8/2015 | Mikalsen | G06F 16/248 |
| | | | | 707/722 |
| 2015/0379058 | A1* | 12/2015 | Chen | G06F 16/23 |
| | | | | 707/756 |
| 2016/0125096 | A1* | 5/2016 | Haverlock | G06F 16/90328 |
| | | | | 707/722 |
| 2016/0188685 | A1* | 6/2016 | Janarthanam | G06F 16/254 |
| | | | | 707/602 |
| 2017/0091446 | A1* | 3/2017 | Bendel | G06F 21/53 |
| 2017/0108348 | A1* | 4/2017 | Hansen | H04W 4/44 |

* cited by examiner

EXAMPLE 1: CONTEXT-SPECIFIC DUPLICATE RECORDS

TABLE 1: INDIVIDUALS

| | FIELD 1: ID | FIELD 3: HEALTH | FIELD 4: CONTEXT |
|---|---|---|---|
| RECORD 1 | FIELD 1 VALUE: 782192602 | FIELD 3 VALUE: 022391582 | FIELD 4 VALUE: INVOICING |
| RECORD 1 | FIELD 1 VALUE: 782192602 | FIELD 3 VALUE: SUBSTITUTE | FIELD 4 VALUE: EMPLOYER |
| RECORD 1 | FIELD 1 VALUE: 782192602 | FIELD 3 VALUE: 022391582 | FIELD 4 VALUE: EMPLOYER |
| RECORD 2 | FIELD 1 VALUE: 535821720 | FIELD 3 VALUE: 683309254 | FIELD 4 VALUE: INVOICING |
| RECORD 2 | FIELD 1 VALUE: 535821720 | FIELD 3 VALUE: SUBSTITUTE | FIELD 4 VALUE: EMPLOYER |
| RECORD 2 | FIELD 1 VALUE: 535821720 | FIELD 3 VALUE: 683309254 | FIELD 4 VALUE: EMPLOYER |

EXAMPLE 2: MASTER RECORD

TABLE 1: INDIVIDUALS

| | FIELD 1: ID | FIELD 3: HEALTH | FIELD 4: CONTEXT |
|---|---|---|---|
| RECORD 1 | FIELD 1 VALUE: 782192602 | FIELD 3 VALUE: SUBSTITUTE | FIELD 4 VALUE: <ALL> |
| RECORD 2 | FIELD 1 VALUE: 535821720 | FIELD 3 VALUE: SUBSTITUTE | FIELD 4 VALUE: <ALL> |
| RECORD 3 | FIELD 1 VALUE: 379381638 | FIELD 3 VALUE: SUBSTITUTE | FIELD 4 VALUE: <ALL> |

FIG. 3

RECONCILING FOREIGN KEY REFERENCES AND TABLE SECURITY POLICIES

CROSS-REFERENCE TO RELATED APPLICATIONS

This application claims priority under 35 U.S.C. § 119(e) to Provisional U.S. Patent Application No. 62/339,084, entitled "RECONCILING FOREIGN KEY REFERENCES AND TABLE SECURITY POLICIES," filed on May 19, 2016, the entirety of which is hereby incorporated by reference as if fully rewritten herein.

BACKGROUND

Within the field of computing, many scenarios involve a system that provides access to a database. In many such scenarios, the database comprises a set of tables respectively representing a type of data object, where the respective tables comprise a set of fields or columns that represent various properties of the type of data object represented by the table. The respective tables also comprise a set of records that respectively represent an instance of the data object, where the respective records store a value for the respective fields of the table. Databases of many varieties may be generally structured in this manner, including relational databases, key/value stores, hierarchical data sets such as Extensible Markup Language (XML) documents, object databases, and document-oriented storage systems.

In many such scenarios, some records of the database may be interrelated, wherein, for a particular field of a first table, the records of the table store a value that corresponds to an identifier of a record of a different table. For example, a first table may comprise a foreign key relation field, where some referencing records are related through the foreign key relation field to referenced records of a second table. The referencing is often accomplished by storing a value in the foreign key relation field for the respective records that corresponds to an identifier (such as a unique or distinctive key) of a particular record of the referenced table. Many such databases alternatively permit such records to store a non-reference value in the foreign key relation field, such as a null value indicating that a particular record of the referencing table is not related to any record in the referenced table.

In many such database scenarios, the system allows one or more requesters (such as entities, users, devices, applications, or processes) to access to the database. Access is often provided via a query engine, wherein a requester submits a query that identifies the types of records that are desired. Queries are often formulated and evaluated according to a query language, such as a variant of the Structured Query Language (SQL). Often, the system evaluates the query to formulate a response, comprising the records and/or portions thereof that satisfy the details of the query. Additionally, many systems may enable particular portions of the database to be secured, such that data is provided in response to queries only if submitted by an authorized requester, and queries submitted by other requesters are denied in compliance with the security parameters. For example, a large enterprise may include a variety of companies or units that are respectively permitted to access only a specific subset of the tables, table fields, and/or records of the database. Often, the system utilizes a security policy that specifies the details of the database security, such as which portions of the database are secured; the requesters who are permitted and/or restricted to access such portions; the types of access that requesters are authorized to request, such as read, update, delete, and query requests; and mechanisms whereby such requesters may authenticate an identity, such as username and password credentials or a cryptographic security token.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Within scenarios involving the fulfillment of queries over databases, the evaluation of a query may involve a consideration of the request contained in the query, such as the resources that the query identifies (e.g., the particular tables, attributes, and records of the database involved in the query); the types of operations that the query requests over such resources; and permission to access the requested resources. For example, the database may evaluate whether the identified resources exist; whether the specified operations are applicable to the resources; and/or whether the user is permitted to access the requested resources.

However, in some circumstances, the query may involve a relational field that contains a foreign key value referencing a second table of the database. For example, the second table may comprise one or more fields that serve as a key of the table, such that the values of these (one or more) fields are unique for each record of the second table, and a particular record of the second table may be referenced according to the combination of such values. The records of the first table may contain a relational field comprising values that serve as foreign key references. While the database may verify the permission of the user to access the resources identified in the query—e.g., the first table and the attributes of the first table—the database may not further recognize and verify the permission of the user to access the second table that the relational field references. That is, while the user may be permitted to access the values in the relational field, the user may not be able to reference the records of the second table that such values identify.

As a result, the response presented to fulfill the request may include values that correspond to the identifiers of records of the second table. The requester may presume that the provided data is within the security policy of the database, and may act upon the records provided by the system, which may include dereferencing the provided foreign key values, such as through subsequent queries submitted to the system. Because the requester is not permitted to access the second table in which such referenced records exist, the system refuses to fulfill the request. Such a response may be unexpected by the requester, which may presume that data provided by the system (including foreign key reference values) comprises a coherent data set. A business logic utilized by the requester may unexpectedly fail, which may involve raising exceptions and/or causing transactions to fail and rollback. Such consequences arise from a tacit communication gap between the requester and the system, wherein the requester anticipates that data returned by the system is valid and available for use by the requester (including dereferencing), whereas the system validly provided the foreign key reference values without verifying the subsequent accessibility of the referenced records in the second table to the requester.

In view of such circumstances, the present disclosure provides techniques for reconciling database table security policies and foreign key relations. In accordance with such techniques, a system may store a relational field of the first table comprising a value that references a second table of the database. The system may receive, from a requester, a request comprising a query involving a record of the first table, where the record includes, for the relational field, the value that references the second table. In view of the considerations presented herein, the system may evaluate a context of the request, wherein the context is supplemental to the query, and wherein the context relates to the relational field. Based on the context, the system may generate a response that substitutes, for the value that references the second table, a substitute value that does not reference the second table. The system may then present the response including the substitute value, in order to fulfill the request.

The substitution of the values of the relational field may be achieved in a variety of ways. A first such technique may involve representing the respective records of the first table as a master record, which providing the substitute value for the relational field in response to queries by non-authorized requesters. The substitution of values for the relational field may be achieved by overwriting the relational field with the substitute value, which is then provided in response to queries over the table. In a second such variation of this first example, the system may refrain from overwriting non-substitute values in the records. Instead, at query time, may evaluate the context of the query, and may either selectively substitute the substitute value for the existing values in response to queries, even for records with non-substitute values for the relational field. As one such example, the system may base this selectivity upon a context of the request, wherein the context is supplemental to the query. For example, the context may involve details of the request such as the access permissions of the requester; responses to authorized requesters may include the default or non-substitute value in the respective records. These details may pertain to the request, but may neither be specified nor implicit in the query, which may simply specify a selection and projection logic over specified resources of the database. Responses to non-authorized requesters may result in the substitute value being substituted for the relational field irrespective of the contents of the record. In other variations, the system may restrict updates to the foreign key field of the records of the table to particular contexts (e.g., requests received from users who occupy such roles as a database administrator, user, and/or automated process). The system may implement the substitution by hiding the relational field during updates of the table in order to restrict the writing of new values to the relational field of the records. In this manner, the system causes non-authorized contexts to receive the substitute value of the relational field for the records of the table, in accordance with the context that is supplemental to the query.

A second such technique for achieving the substitution of the values of the relational field involves duplicating the records of the table, with one context-specific copy for each context of requests to access the table. For example, if a table comprising a relational field is accessible in three contexts, the system may automatically store three context-specific copies of the respective records of the table, wherein, for a particular record, each context-specific copy represents a version of the record that is to be provided in response to queries in a particular context. When a request is received, the system may examine the context of the request, wherein the context is supplemental to the query, and wherein the context relates to relational field. For example, the examination may involve an identification of the context-specific copy of a record that the second table is accessible in this particular context, where the context-specific copy may specify either a substituted (e.g., default) value or a non-substituted (e.g., original) value of the relational field. If the context of the request indicates that the second table is not accessible in this particular context, the context-specific copy of the record may specify only the substitute value for the relational field. In this manner, the system evaluates the context of the request, wherein the context is supplemental to the query, to present non-authorized contexts with responses that include the substitute value of the relational field for the records of the table. These and many other variations of system configurations may facilitate access to a database in a manner that reduces exceptions and unexpected results that may arise from the use of foreign-key references, in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 3 is an illustration of an example scenario featuring two examples of system configurations that provide substitute values of the relational field for the records of the table to contexts that are not permitted to access a related table, in accordance with the techniques presented herein.

DETAILED DESCRIPTION

Figure 1:
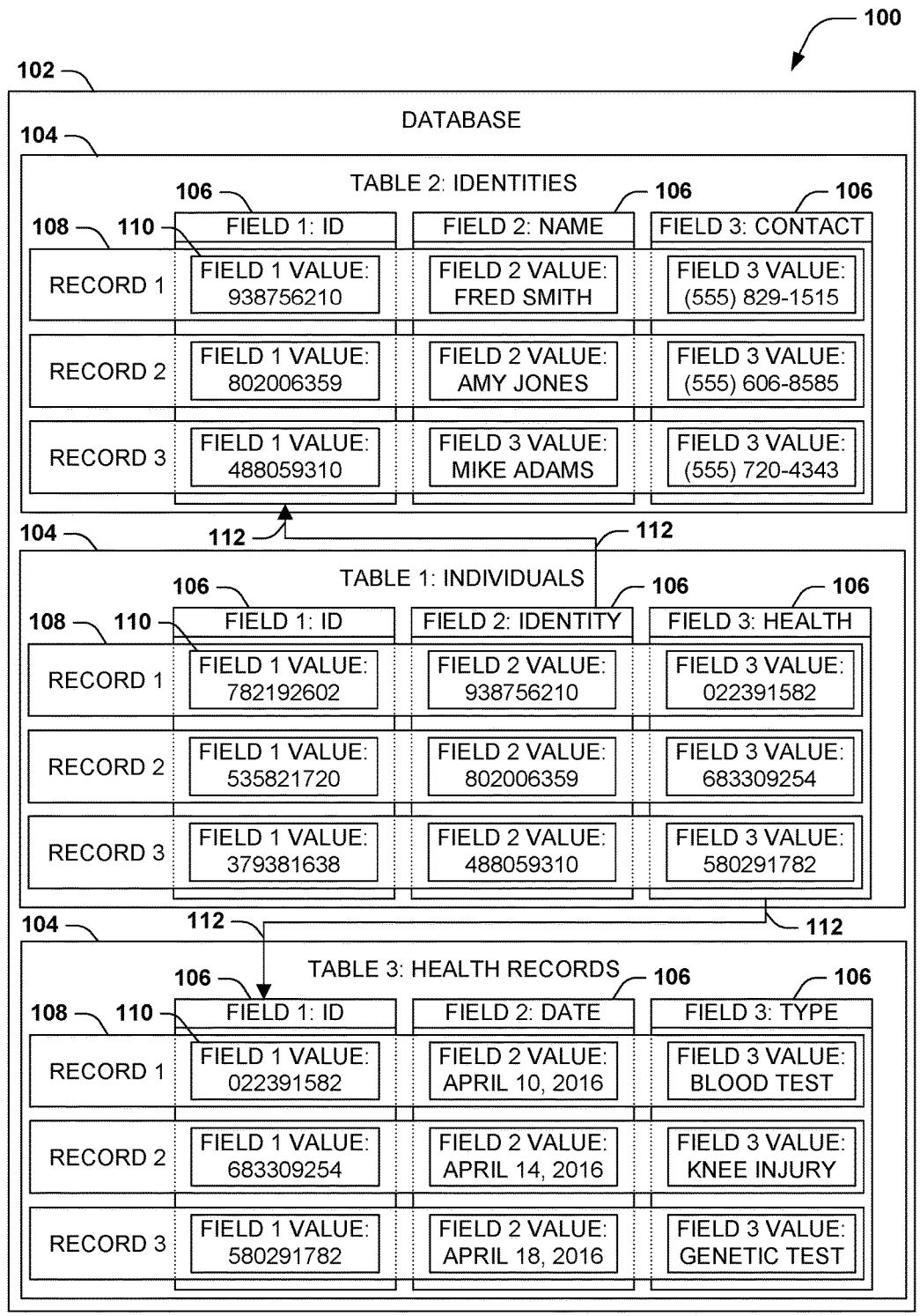
FIG. 1 is an illustration of an example scenario featuring a database comprising a set of related records.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring a database 102 that may be stored by a system. The database 102 comprises a set of tables 104 that respectively represent a type of data object stored by the database 102 (e.g., a first table 104 stores data representing individuals; a second table 104 stores data representing the identities of such individuals; and a third table 104 stores health records of the represented individuals, such as medical records from visits to a physician). The respective tables 104 in turn comprise a set of fields 106 that define various properties of the data object represented by the table. For example, the table 104 representing the identities of the individuals may include fields 106 for the name of the individual and a contact identifier such as a phone number, while the table 104 representing the health records of the individuals may include fields 106 for the data of a visit to a physician's office and a type of service provided. The respective tables 104 of the database 102 further comprise a set of records 108, each representing an instance of the data object type for which the table 104 is provided. The respective records 108 store a value 110 for the respective fields 106 of the table 104, such as a Boolean value, a number, a string, a block of text, or an embedded data object encoded with a serialization format.

The structure of the database 102 also permits the interrelation of the records 108 of the tables 104. A particular field 106 of a table 104 may include reference values that represent a relation 112 between the record 108 and a corresponding record 108 of a different table 104. For example, the first table 104 that represents individuals does not directly encode values 110 for the fields 106 representing various aspects of the identity of the individual. Instead, a field 106 of the first table 104 stores reference values 110 that distinctively identify a particular record 108 of the identities table 104 that represents the identity of the individual. This type of relation 112 is often identified as a foreign-key relation, where the respective records 108 of the referenced table 104 are identifiable by a "key" (such as the values 110 of one field 106, or a combination of fields 106, that are unique or at least distinctive with respect to the other records 108 of the table 104), and where records 108 of the referencing table 104 store values 110 for the referencing field 106 that correspond to the keys of the "foreign" or referenced table 104. The foreign key reference values 110 of the respective records 108 may therefore be used to associate the record 108 with the corresponding record 108 of the foreign table 104. In this manner, the database 102 may store a set of records 108 that are interrelated according to a specifically designed structure that models the collection of data objects that the database 102 represents.

Figure 2:
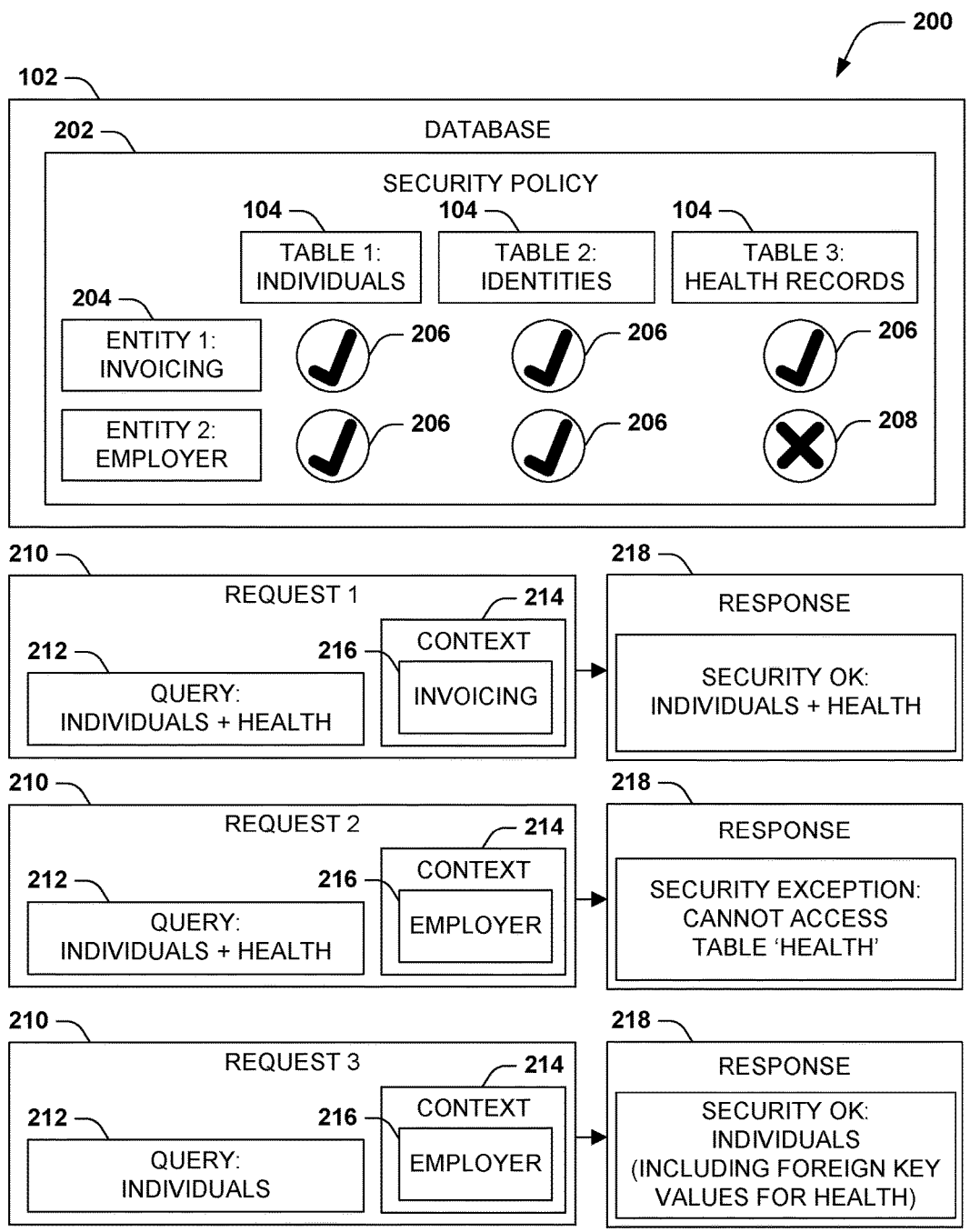
FIG. 2 is an illustration of an example scenario featuring queries formulated against the database of FIG. 1 and the results thereof.

FIG. 2 is an illustration of an example scenario 200 that depicts accesses of the database 102 presented in the example scenario 100 of FIG. 1. In this example scenario 200, a set of requests 210 are received that comprise a query 212 requesting access to various portions of the database 102. Such queries 212 may be formulated and/or evaluated according to a query language, such as a variant of the Structured Query Language (SQL); the XPath query language provided for XML-structured documents; and/or a "twig" query specified for an unstructured document-oriented storage system. The database 102 may evaluate the query 212 and return a response 218 comprising the set of records 108 that match the query 212.

As further illustrated in this example scenario 200, the database 102 is secured in a manner that fulfills requests 210 to access only particular portions of the database 102 in various contexts. For example, a security policy 202 may indicate that respective tables 104 are permitted to be queried only by selected entities 204; only in certain geographic areas; or only in certain computing environments. Queries 212 submitted by other entities 204 are to be refused, and may result in various behaviors. The example database 102 presented in the example scenarios 100, 200 of FIGS. 1-2 represents a database of health insurance information about a variety of individuals, which is accessible to two entities 204: an invoicing service (which is permitted to access all three tables) and an employer of the individuals (which is permitted to access the individuals and identities, but is restricted from accessing the actual health records of the individuals according to healthcare privacy laws). The security policy 202 represents the permissions 206 and restrictions 208 of the respective tables 104 for the respective entities 204.

In this example scenario 100, the identity of the requester 216 is utilized as the context 214 for the request 210, wherein the context 214 is supplemental to the query 212. That is, while the query 212 indicates the resources of the database 102 that are involved in the query 212, such as the names of tables 104, attributes, and stored procedures, and the logical operations applied thereto as part of the query 212. As demonstrated in the example scenario 200 of FIG. 2, information that pertains to the request 210 and is supplemental to the query 212. The determination of the context 214 may alter the response 218 provided by the system to fulfill the query 212. For example, the security policy 202 may be applied while fulfilling the queries 212 by evaluating the context 214 that is supplemental to the query 212 and, specifically, verifying that the requester 216 of the request 210 is permitted to access the queried portions of the database 102.

As a first such example, the invoicing entity 204, acting as a requester 216, submits a first request 210 including a query 212 to the database 102, which compares the tables 104 specified in the query 212 with the security policy 202, verifies that the requester 216 has permission 206 to access all of the queried tables 104, and provides a response 218 comprising the requested data. As a second example, the employer entity 204 submits a request 210 involving a query 212 to the database 102 involving the individuals and health records tables, and because the security policy 202 prohibits such access. The database 102 may find that at least one of the tables 104 identified in the query 212 is specified in a restriction 208 of the security policy 202, and the response 218 comprises a security exception indicating a refusal to provide the records 108 requested by the query 212. Notably, the queries 212 submitted in both the first request 210 and the second request 210 may be similar or even identical, yet may prompt different results based on the different context 214 of each request 210, wherein the context 214 pertains to the request 210 and the relational field, and wherein the context 214 is supplemental of the query 212. In this manner, the database 102 applies the security policy 202 to the evaluation of the queries 212, and provides responses 218 and requested records 108 consistent with the context 214 of the request, in accordance therewith.

However, in this example scenario 200, a problem may arise due to a logical gap between the structure of the database 102 and the security policy 202. In the model described in the first two examples, a requester 216 may anticipate one of two types of responses 218: a provision of records 108 that the requester 216 is permitted to access and utilize, or a refusal of the query 212 identifying a security exception. However, a third example presented in the example scenario 200 of FIG. 2 involves a query 212 by a requester 216 (i.e., the employer entity 204) that only involves the individuals table 104, for which the security policy 202 indicates a permission 206 for the employer entity 204. Accordingly, the database 102 provides the requested records 108 of the individuals table 104, which includes the "identity" field 106 comprising foreign-key reference values 110 to respective records 108 of the identities table 104. The successful fulfillment of the query 212 may be interpreted by the requester 216 as permission 206 to use the provided records 108, and may proceed by applying further business logic to the returned records 108. Such business logic may include, e.g., dereferencing the foreign-key reference values 110 provided in the response 218. However, dereferencing the provided values involves accessing the identities table 104 of the database 102, for which the security policy 202 indicates a restriction 208 when requested by the employer entity 204. Such a response may be unexpected by the requester 216, due to the interpretation of the provided foreign-key reference values 110 as a permission to use the data identified thereby. If the requester 216 has not anticipated this result, the business logic of the requester 216 may behave in unexpected ways, including issuing an exception due to corrupted or refused data, or incorrectly utilizing a returned error message as valid data that corrupts further processing.

The occurrence of exceptions due to the intersection of foreign-key references and security policies 202, as demonstrated in the third example of FIG. 2, presents a significant problem in the field of data processing. Exceptions may arise that cause data-driven processes to fail at unexpected times and/or behave in an aberrant manner. The rewriting of queries 212 to anticipate and alleviate such responses may consume significant resources of developers and/or database administrators, and in some cases may involve a redesign of the database 102. Alternatively, some providers may be forced to choose between undesirably increasing the security policy 202 (e.g., restricting some entities 204 from accessing an otherwise permitted table 104 if it is related to a restricted table 104) and/or undesirably relaxing the security policy 202 (e.g., permitting some entities 204 to access tables 104 that they should not otherwise be permitted to access in order to reduce unexpected data access exceptions). These and other disadvantages may arise due to the intersection of foreign-key references and database security policies 202 in the manner illustrated in the example scenario 200 of FIG. 2.

B. Presented Techniques

The techniques presented herein are directed to the provision of access to a database 102 in a manner that reduces or avoids problems arising from the intersection of foreign-key references and a table security policy 202 of the database 102, such as illustrated in the example scenario 200 of FIG. 2.

In accordance with the techniques presented herein, a system may provide access to a database 102 comprising a first table 104, which contains a relational field that, for respective records, comprises a value 110 that references a record of a second table 104 of the database 102. The system may determine that the relational field 106 of the first table 104 of the database 102 contains a value 110 that references a second table 104 of the database 102. The system may receive a request 210 to access the database 102 according to a query 212 involving a record 108 of the first table 104, where the record 108 includes, for the relational field 106, the value 110 that references the second table 104. The system may identify a context 214 of the request 210, wherein the context 214 is supplemental to the query 212, and wherein the context 214 relates to the relational field specified in the query 212. Based on the context 214, the system may generate a response 218 that substitutes, for the value 110 that references the second table 104, a substitute value that does not reference the second table 104. The system may then provide the response 218 in order to fulfill the request 210.

FIG. 3 is an illustration of two example scenarios 300 in which such techniques may be implemented. Each of the example scenarios of FIG. 3 involves a database 102 comprising a table 104 that is accessible in response to a set of requests 210, wherein the processing of the request 210 results in the identification of the records 108 of the table 104 that satisfy the details of the query 212, and that are provided as a response 218 that fulfills the request 210. In each example of FIG. 3, at least one field 106 of the table 104 includes a relational field 306 comprising values 110 that respectively represent a foreign-key reference to a second table 104 (not shown) that is only accessible in response to some requests 210. Such determination indicates that the prospect of problems may arise such as those illustrated in the third example of FIG. 2, wherein a response 218 is provided to fulfill a request 210 in compliance with the security policy 202, where the response 218 includes values 110 stored in the records 108 for the respective fields 106 of the table 104, and where some of the fields 106 represent relational fields references to the second table 104 that are permitted based on the contexts 214 of some requests 210 that relate to the relational field 306, but prohibited based on the contexts 214 of other requests 210 that relate to the relational field 306. Accordingly, in the examples of FIG. 3, the database 102 applies the techniques presented herein to avoid providing such foreign-key values 110 that is not permitted to be dereferenced in the context 214 of the request 210. Such techniques involve evaluating the context 214 of the request 210, wherein the context 214 is supplemental of the query 212, wherein the context 214 relates to the relational field 306, and determining that instead of providing the value of the relational field 306 referencing the second table 104, the response 218 may instead include a substitute value that does not reference the second table 104. By substituting a substitute value for the value 110 of the relational field 306 and presenting the response 218 to fulfill the request 210, the system satisfies the request 210 over the database 102 in accordance with the techniques presented herein.

In a first example scenario 302 illustrated in FIG. 3, the provision of the substitute value 304 is achieved through a duplication of the records 108 of the table 104, where the respective records 108 are duplicated to produce a set of context-specific copies 314 of the record 108. For example, the table 104 in the first example scenario 302 of FIG. 3 is determined to include a relational field 306 (i.e., the "health" field 106), where some foreign-key reference values 110 in the relational field 306 of some records 108 refer to corresponding records 108 in the "health records" table 104 that some contexts 214 are not permitted to access. Accordingly, individual records 108 of the table 104 are represented as a set of context-specific copies 314, wherein one context-specific copy 314 of the record 108 is generated for the respective contexts 214 of requests 210 for the record 108. Additionally, a context field 308 is added to the table 104 to indicate the context 214 with which the respective context-specific copies 314 are associated. For example, because the table 104 in the first example scenario 302 is accessible to three contexts 214, the individual record 108 is duplicated into three context-specific copies 314, each identifying, for the context field 308, a context-specific value 310 that identifies a particular context 214 for which this context-specific copy 314 is to be provided when a request involving the record 108 is submitted in a particular context 214. Additionally, for the relational field 306, the values 110 stored for the respective context-specific copies 314 of the record 108 may be updated to indicate the value 110 that is to be provided. For example, when the invoicing entity 204 submits a query 212 over the individuals table 104, the initial value 110 of the relational field 306 (referencing a record 108 of the health records table 104) is to be provided, reflecting the permission 206 of the invoicing entity 204 to access the health records table 104. Accordingly, the initial value 110 is retained in the relational field 306 of the context-specific copy 314 of the record 108 that is specific to the context 214, and in this example, that is specific to the invoicing entity 204. Conversely, when the employer entity 204 submits a query 212 over the individuals table 104, the response 218 excludes the initial value 110 of the relational field 306, since reflecting the restriction 208 of the context 214 in which the invoicing entity 204 requests access to the health records table 104. Accordingly, the initial value 110 is overwritten with the substitute value 304 in the relational field 306 of the context-specific copy 314 of the record 108 for the context 214 in which the employer entity 204 requests access to the health records table 104. Queries 212 directed to the table 104 may be also parameterized to identify the context 214 (e.g., the requester 216), and enable the selection of the corresponding context-specific copies 314 of the records 108 for inclusion in the response 218.

As a second example 312, for a first table 104 that includes a relational field 306 that references a second table 104 that is not accessible in all contexts 214 of such requests 210 (e.g., a second table 104 that is not accessible to all requesters 216), a substitute value 304 may be provided for the relational field 306. In this first example scenario 302, the substitute value 304 is written into the records 108 for the relational field 306 of the first table 104, overwriting any other values 110 that may previously have been stored for the relational field 306. Alternatively (though not shown), the values 110 written in the records 108 of the table 104 may be retained, but the substitute values 304 may be provided for the records 108 when a response 218 includes the relational field 306 of the table 104. As a further optional variation, the table 104 may include a context field 308 including a context-specific value 310 that identifies the contexts 214 of requests 210 in which the record 108 is to be provided as a response 218. Moreover, the context field 308 may be set to a master context value 310 that includes all of the contexts 214 of the requests 210, thus enabling the single record 108 to be included in the response 218 to requests 210 in any such context 214. The inclusion of the context field 308 and master context value 310 promote the configurability of the database 102 (e.g., by permitting an administrator to switch between a context-specific duplicate records database configuration and a master record database configuration); the inclusion of a context field 308 in both configurations enables the particular solution to be altered without necessitating an update of the structures of the tables 104. These and other examples may be utilized to facilitate access to the database 102 of the system in accordance with the techniques presented herein.

C. Technical Effects

Various uses of the techniques presented herein to cause a system to provide access to a database 102 may result in a variety of technical effects.

A first technical advantage that may be achievable through the techniques presented herein involves the reduction and possible avoidance of providing foreign-key reference values 110 in response to requests 210 in contexts 214 that are supplemental of the queries 212 of the requests 210, and wherein the contexts 214 relate to the relational field 306, where the table 104 to which the relational field 306 relates is not accessible in the context 214 of the request 210. Because such circumstances may raise a security exception and/or invoke unexpected behavior in such contexts 214 (such as illustrated in the third example in the example scenario 200 of FIG. 2), the use of the techniques presented herein to provide substitute values 304 in such circumstances, rather than the initial values 110 that cannot be dereferenced, promotes the functionality of the system and/ or data-driven applications serviced thereby.

A second technical advantage that may be achievable through the techniques presented herein involves the administration of the database 102 and/or the database server. For example, the example scenarios 302, 312 in FIG. 3 illustrate an automated approach to the protection of the relational field 306 and the reference values 110 stored therein. That is, the identification of the relational field 306 and the task of removing reference values 110 from responses 218 necessitates neither the attention of a database designer during the specification of the definitions of the tables 104; of the query designer that designs queries applicable to the table 104; of the security policy designer that specifies the permissions 206 and/or restrictions 208 of the database 102; nor a requester 216 that submits the query 212 and receives the response 218. Rather, the substitution of substitute values 304 for the values 110 of the relational field 306 may be achieved at configuration time by instructing the database 102 to apply a technique such as presented herein. The database 102 is capable of implementing the configuration option (e.g., using the techniques in either of the example scenarios 302, 312 in FIG. 3) without further involving the administrators and/or users of the database 102 (e.g., without involving the restructuring of the database 102, the redesign of queries 212, and/or the adaptation of business logic in various contexts 214 to anticipate responses 218 that include broken reference values 110).

A third technical advantage that may be achievable through the techniques presented herein involves the scalability and/or performance of the database 102. Some variations of the techniques presented herein (such as the techniques in either of the example scenarios 302, 312 of FIG. 3) provide that the substitution is wholly or predominantly completed by altering the records 108 of the database 102, e.g., by creating and storing context-specific copies 314 of the respective records 108, and/or substituting the initial value 110 with a substitute value 304 of the relational field 306 in master-record scenario. Accordingly, the fulfillment of queries may utilize such preconfigured information to supply only reference values 110 for which dereferencing is permitted in the context 214 of the request 210, without applying significant additional logic executed during query time to effectuate the presentation of such content. By reducing the processing complexity of fulfilling queries 212, some such variations of the techniques presented herein may reduce the latency of fulfilled requests, and/or increase the number and/or throughput of requests 210 to responses 218 in a manner that promotes the scalability of the database 102.

A fourth technical advantage that may be achievable through the techniques presented herein involves promoting the consistent application of the security policy 202 of the database 102. For example, as previously noted, database administrators who seek to avoid such broken foreign reference key scenarios are sometimes compelled to choose between over-applying the security policy 202 (e.g., restricting access to tables 104 to some contexts 214 that otherwise have permission 206 to access) and under-applying the security policy 202 (e.g., relaxing restrictions 208 on tables 104 for which access should be prohibited in some contexts 214). The use of the techniques presented herein provides additional configuration options that enable a more precise and consistent application of the security policy 202 of the database 102.

A fourth technical advantage that may be achievable through the techniques presented herein involves a more faithful application of the security policy 202 in a manner that reduces inadvertent security leaks. For example, the inclusion in the security policy 202 of a restriction 208 on a particular table 104 represents an indication that a particular entity 204 should not be permitted to receive information about the contents of the table 104. Blocking access to the identified table 104, while necessary to implement such a security policy 202, may not be adequate, where some information about the contents of the table 104 are nevertheless available to the entity 204 in the relational field 306 of another table 104 that the entity 204 is permitted to access. For example, inspection of the reference values 110 in the relational field 306 of the individuals table 104, which correspond to records in a second table 104 of the database 102, may reveal the total number of records 108 in the second table 104; the number of records 108 in the second table 104 that are associated with respective records 108 in the first table 104; and/or the nature of the relationships therebetween, such as the number of records 108 in the second table 104 that correspond to particular patterns in the values 110 of the other fields 106 of the first table 104. For example, even if a context 214 does not permit access to the table 104 storing the health records of a particular individual, the requester 216 may nevertheless examine the reference values 110 of the individuals table 104 to determine that a particular individual has a corresponding record 108 in the health table 104, and, in some scenarios, the number of such records 108 in the health table 104 that indicate the number of visits that the individual has made to physicians. Such information may represent a significant leak of secured information contrary to the security policy 202, even when the security policy 202 is applied directly as specified. Many such technical effects may arise from various embodiments of the techniques presented herein.

D. Example Embodiments

Figure 4:
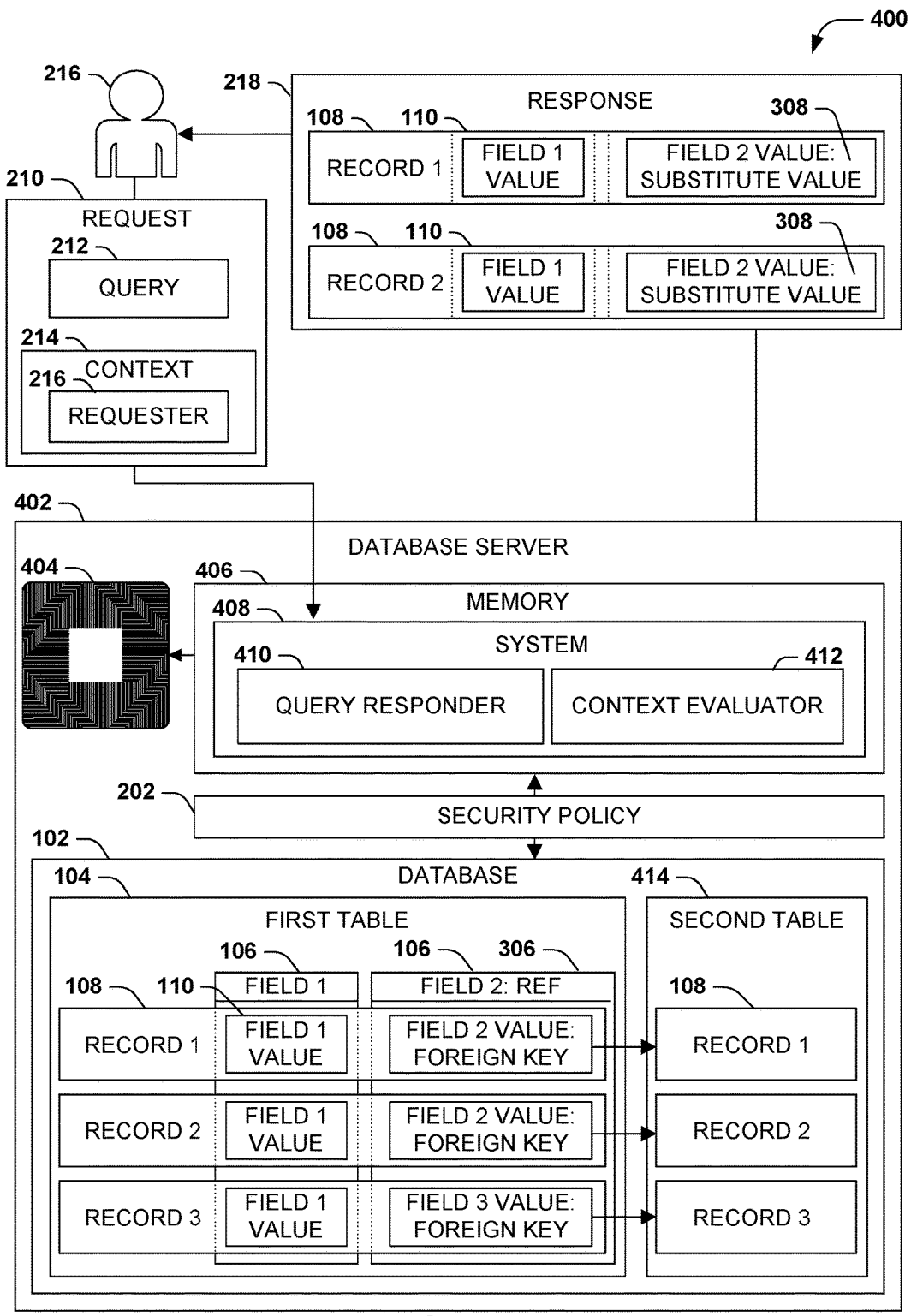
FIG. 4 is an illustration of an example system that provides access to a database in accordance with the techniques presented herein.

FIG. 4 presents a first example embodiment of the techniques presented herein, illustrated as an example database server 402 to provide access to a database 102 in response to a request 210 comprising a query 212. In this example scenario 400, the database server 402 comprises a processor 404 and a memory 406 storing instructions that, when executed by the processor 404, implement an example system 408 that operates according to the techniques presented herein. The memory 406 may also store other components of the database server 402, such as the database 102 and/or a security policy 202, or a different memory of the database server 402 may store some or all of these additional components (e.g., a first memory may store the database 102; a second memory may store the security policy 202, and a third memory 406 may store one or more components of the system 408).

The example system 408 comprises a query responder 410, which receives a request 210 comprising a query 212 involving a record 108 of the first table 104, where the record 108 includes, for the relational field 306, the value 110 that references the second table 414. The example system 408 also comprises a context evaluator 412, which evaluates the context 214 of the request 210, wherein the context 214 is supplemental of the query 212, and wherein the context 214 relates to the relational field 306. For example, the database server 402 may determine whether the second table 414 is accessible within the context 214 of the request 210. If the second table 414 is not accessible within the context 214 of the request 210, then based on the context 214 of the request 210, the processing of the query 212 may generate a response 218 that substitutes a substitute value 304 for the value 110 of the relational field 306 in the records 108 of a result set. The database server 402 may return the response 218 in fulfillment of the request 210. In this manner, the example system 408 enables the database server 402 in the example scenario 400 of FIG. 4 to provide access to the database 102 in accordance with the techniques presented herein.

Figure 5:
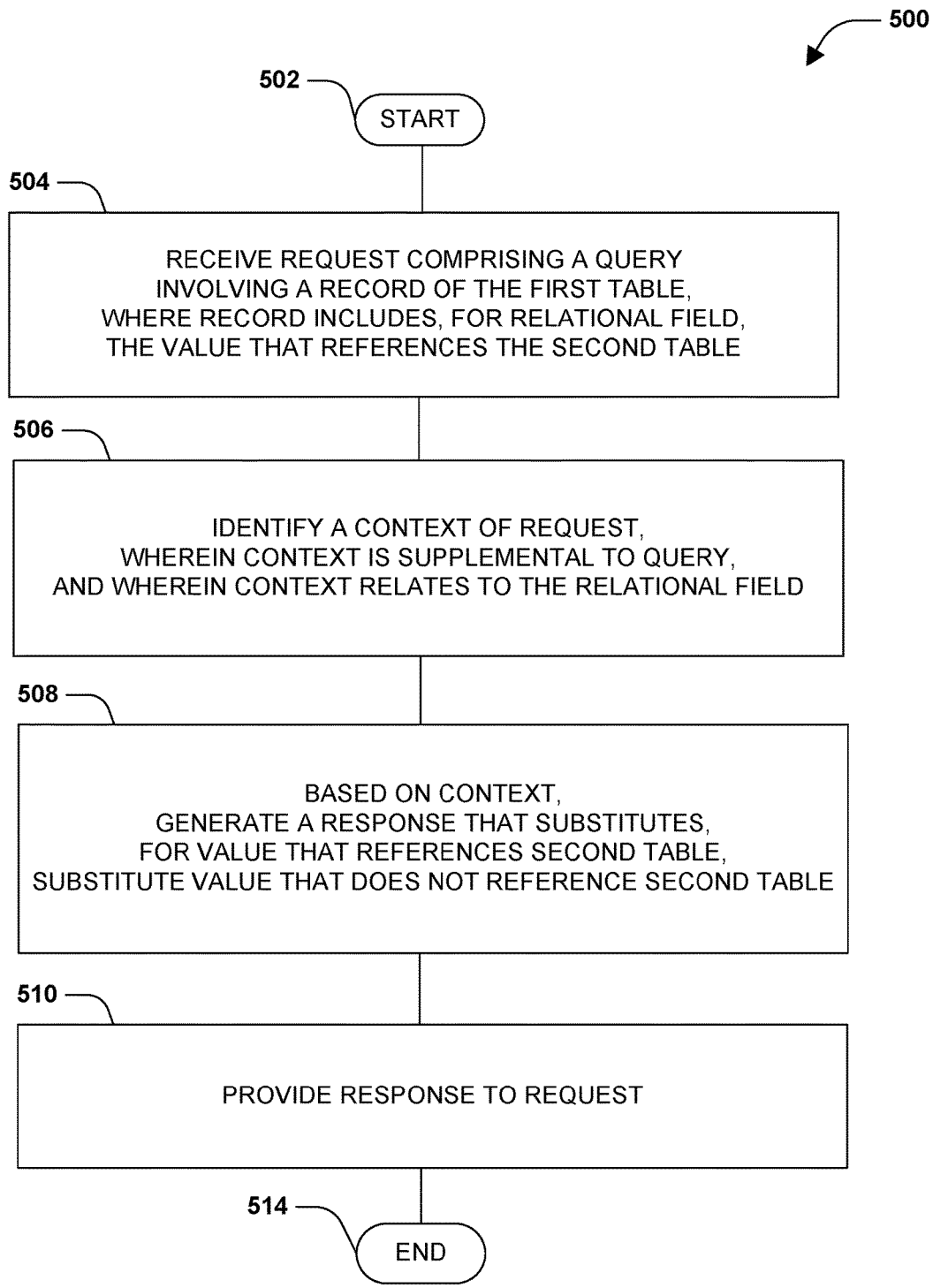
FIG. 5 is an example method of providing access to a database stored by a system in accordance with the techniques presented herein.

FIG. 5 is an illustration of a second example embodiment of the techniques presented herein, illustrated as an example method 500 of providing access to a database 102 comprising at least two tables 104 respectively comprising fields 106 and a set of records 108 comprising values 110 for the respective fields 106. The example method 500 may be implemented, e.g., as a set of instructions stored in a memory component of a database server 402, such as a memory circuit, a platter of a hard disk drive, a solid-state storage device, or a magnetic or optical disc, and organized such that, when executed on a processor of the device, cause the database server 402 to operate according to the techniques presented herein.

The example method 500 begins at 502 and comprises receiving 504 a request 210 comprising a query 212 involving a record 108 of the first table 104, where the record 108 includes, for the relational field 306, the value 110 that references a second table 414 of the database 102. The example method 500 also comprises identifying 506 a context 214 of the request 210, wherein the context 214 is supplemental to the query 212, and wherein the context 214 relates to the relational field 306. The example method 500 also involves, based on the context 214 of the request 210, generating 508 a response 218 to the request 210 that substitutes, for the value 110 that references the second table 104, a substitute value 304 that does not reference the second table 414. The example method 500 also involves providing 510 the response 218 in response to the request 210. In this manner, the example method 500 enables the database server 402 to provide access to the database 102 in accordance with the techniques presented herein, and so ends at 512.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
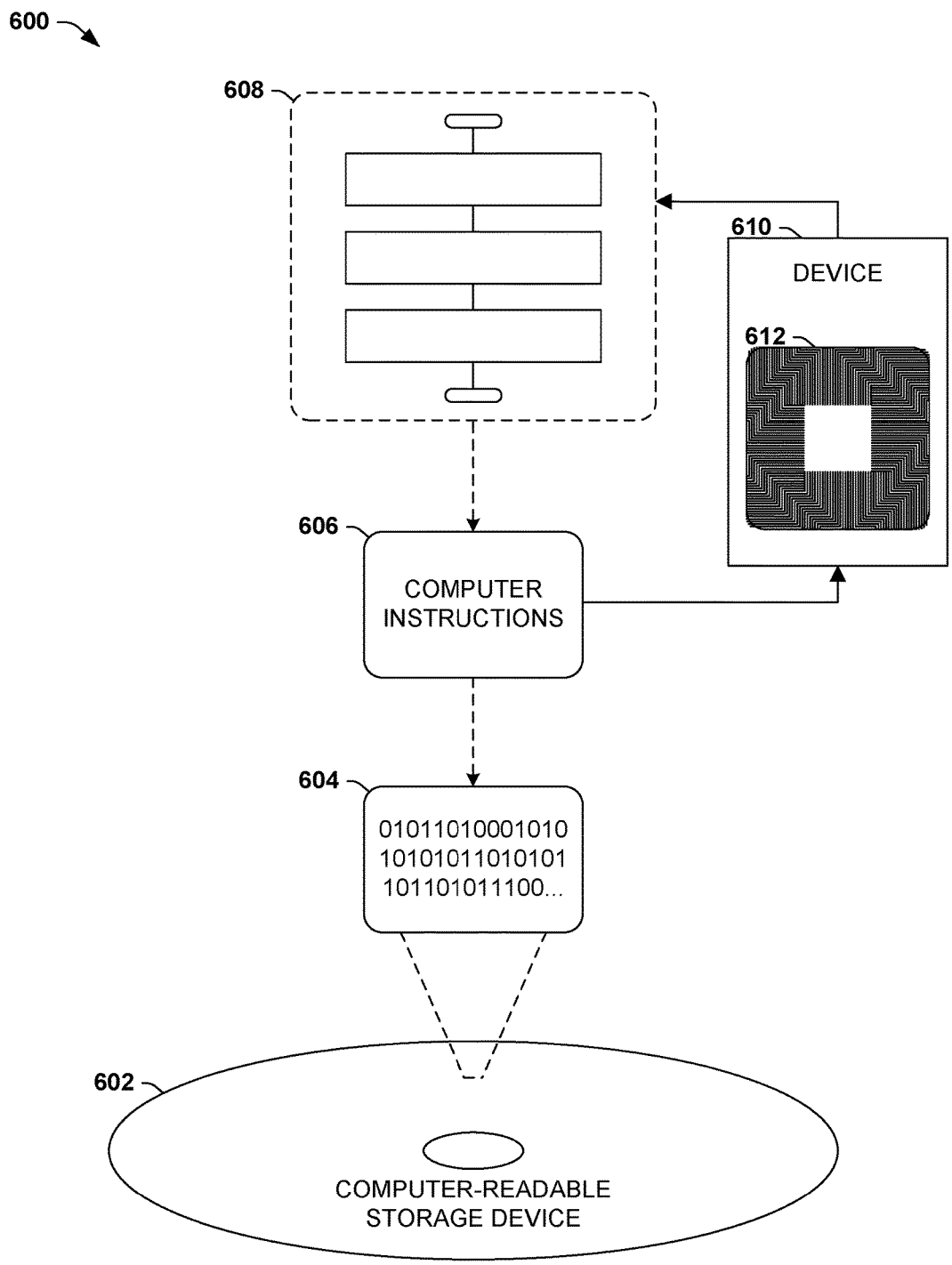
FIG. 6 is an illustration of an example computer-readable storage device storing instructions that cause a system to provide access to a database in accordance with the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 608 of a device 610 such as a database server 402, cause the device 610 to operate according to the principles set forth herein. In a first such embodiment, the processor-executable instructions 606 of the computer-readable storage device 602 may produce a database server that provides access to a database 102 in accordance with the techniques presented herein, such as the example database server 402 in the example scenario 400 of FIG. 4. In a second such embodiment, the processor-executable instructions 606 of the computer-readable storage device 602 may produce an example system that causes a database server 402 to operate in accordance with the techniques presented herein, such as the example system 408 of FIG. 4. In a third such embodiment, the processor-executable instructions 606 may cause a device such as a database server 402 to perform a method of providing access to a database 102 in accordance with the techniques presented herein, such as the example method 500 of FIG. 5. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example database server 402 of FIG. 4; the example system 408 of FIG. 4; the example method 500 of FIG. 5; and/or the example computer-readable storage device 602 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices as a database server 402 that is configured in the manner presented herein, such as workstations, laptops, tablets, mobile phones, game consoles, portable gaming devices, portable or non-portable media players, media display devices such as televisions, appliances, home automation devices, computing components integrated with a wearable device integrating such as eyewear or a watch, and supervisory control and data acquisition (SCADA) devices.

As a second variation of this first aspect, the techniques presented herein may be utilized with many kinds of databases 102, such as relational databases; key/value stores; hierarchical data sets such as Extensible Markup Language (XML) documents; object databases; and document-oriented storage systems. It may be appreciated that while the examples herein utilize relational databases as a familiar example, the various elements of such relational databases often have functional equivalents in other database types. For example, in an object database, the records 108 of the tables 104 may correspond to instances of objects of a particular object type; the fields 106 and values 110 of the records 108 may correspond to the fields and values 110 of the object instances; and relations 112 between related records 108 in different tables 104 may correspond to pointers or references stored in one object instance and referencing a different object instance. In view of such functional equivalents among various types of databases, the techniques presented herein are applicable to a wide variety of databases to address similar types of problems that may arise therein. Similarly, the queries 212 specified against such databases 102 may be implemented using a variety of query languages, such as a variant of the Structured Query Language (SQL); the XPath query language provided for XML-structured documents; and/or a "twig" query specified for an unstructured document-oriented storage system.

As a third variation of this first aspect, the techniques presented herein may be utilized with databases 102 to which many types of security policies 202 may have been applied. Such security policies 202 may comprise, e.g., a table-level security policy 202 that specifies the contexts 214 in which access to the respective tables 104 of the database 102 are permitted and/or restricted; context-level security that indicates the permissions 206 and/or restrictions 208 to the database for the various contexts 214; and/or query-level security that indicates the types of queries 212 that are applicable to the database 102. Many such scenarios may be device to which the techniques presented herein may be applicable.

E2. Contexts and Context Determination

A second aspect that may vary among embodiments of the techniques presented herein involves the contexts 214 of the requests 210, wherein the respective contexts 214 are supplemental to a query 212, and wherein the query that specifies a first table 104 of the database 102, and wherein the respective context 214 relate to a relational field 306 in the first table 104, wherein the relational field 306 comprises values that relate to a second table 104 of the database 102.

As noted previously, the context 214 pertains to the request 210, and is supplemental to the query 212. For example, the query 212 may identify the logical operations to be performed over the database 102 to retrieve some data, such as an identification a set of tables and fields of the database 102; a WHERE operator that specifies criteria to be applied over the specified tables and fields to identify a subset that satisfies the criteria; and a SELECT clause that projects certain properties of the subset to be delivered as a response, such as certain attributes of the records of the subset, or a calculation to be performed over the subset, such as sorting, counting, and limiting the subset to a certain number of records. However, supplemental to the query 212, the request 210 may include a variety of information that affects how the query 212 is to be processed and how the result is to be returned. Such information may include: the time, place, and/or manner in which the request 210 was submitted to the system; a history of previous, concurrent, and/or subsequent requests 210 submitted to the system and the database 102 by this requester 216 or other requesters 216; and/or details about the system, such as its current processing load or the amount of time involved in evaluating the request 210. These additional properties of the request 210 may affect the processing of the request 210, while not being specified by and/or implicit in the logical operations specified by the query 212; indeed, a variety of requests 210 specifying the same query 212 may result in different responses, due to the different contexts 214 in which each such request 210 is presented. Moreover, these details may relate to the relational field 306 in a first table 104 that references a second table 104 of the database. The context 214 may therefore facilitate the processing of the query 212 against the database 102 based on the details of the request 210 that are supplemental to the query 212.

Figure 7:
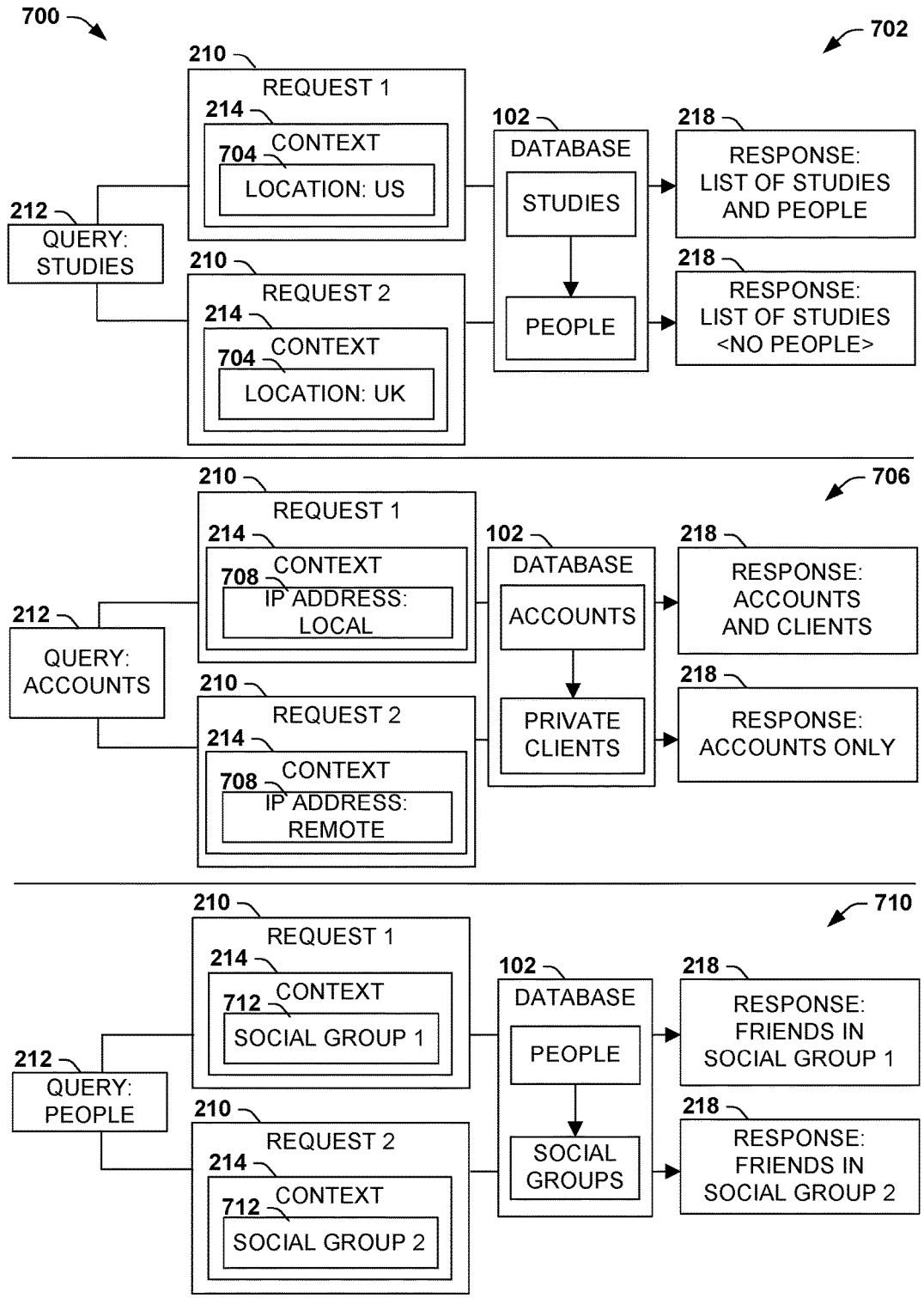
FIG. 7 is an illustration of an example scenario featuring a set of contexts of various requests that may cause a system to present a substitute value instead of a value of a relational field of a first table that references a second table in accordance with the techniques presented herein.

As previously noted, the context 214 of a request 210 may involve the requester 216 (e.g., an identity of the requester 216, and/or a role occupied by the requester 216). FIG. 7 is an illustration of some example scenarios 700 that provide a variety of additional examples of contexts 214 that relate to the relational field 306 of the first table 104, and that, for some requests 210, may produce a response 218 featuring a substitution a substitute value 304 for the values 110 of the relational field 306, where the substitute value 304 does not reference the second table 104 of the database 102. Notably, in these example scenarios 700, the responses 218 to different requests 210 vary with respect to the substitution of the substitute value 304, even though an identical query 212 is presented in each request 210.

In a first example scenario 702, access to a second table 104 of the database 102 is contingent upon a location 704 in which the request 210 originates. For example, the database 102 may comprise a first table 104 comprising records about medical studies that includes a relational field 306 referencing a second table 104 that contains records identifying the people involved in each study. Moreover, healthcare privacy laws may indicate that records about people are to be retained within a certain country, and therefore may only be disclosed in response to requests 210 initiated in a particular location 704 (e.g., requests originating in the United States), while requests 210 that originate from other locations 704 are to be prevented from accessing the studies comprising such references to people. In this example scenario 702, the context 214—i.e., the geographic location to which the response 218 is to be delivered—is related to the relational field 308 of the first table 104 of the database 102—i.e., whether or not patient data for individual studies may be included in the response 218.

Accordingly, the location 704 of the request 210 may be evaluated as the context 214, where the location 704 in which the request 210 was initiated determines whether or not a requester 216 submitting the request 210 is permitted to access the people table 104 of the database 102. For a first request 210 that is associated with a first context 214 comprising a location 704 originating within the United States, the database 102 may evaluate the first context 214 and determine that the request 210 is permitted to access both the Studies table 104 and the People table 104, and may therefore return a response 218 comprising values 110 that reference the People table for each study. For a second request 210 that is associated with a second context 214 comprising a location 704 originating from within the UK, the database 102 may evaluate the second context 214 and determine that the request 210 is not permitted to access the People table 104, and may therefore return a response 218 that substitutes a substitute value 304, such as Null, for the portion of the relational field 306 in each record of the response 218.

In a second example scenario 706, a database 102 of a company may comprise a list of accounts that are held by various clients, and while the accounts may be public knowledge, the clients holding such accounts may be private. The security policy 202 may be implemented according to a logical location of the request 210, where the private clients are only to be revealed for requests 210 initiated by devices within a private local area network (LAN) of the company. Accordingly, the context 214 of the request 210 may be evaluated as the IP address 708 of the requesting device. Even if a public request 210 is prohibited from accessing the Clients table 104, the provision of the values 110 stored for the relational field 308 of the Accounts table 104 may inadvertently disclose some such information (e.g., that two accounts with matching values 110 for the relational field 308 are held by the same client). In this example scenario 706, the logical location of the request 210 represents a context 214 that relates to the relational field 308 of the Accounts table 104, which is to include information about the clients associated with the accounts only for requests 210 initiated within the company as indicated by the IP address 708.

Accordingly, a first request 210 may be received that includes a query 212 over the Accounts table 104 of the database 102, which may evaluate the IP address 708 of the requesting device and determine that the context 214 of the first request 210 permits the disclosure of the values 110 stored in the relational field 308 that refer to the Clients table 104 of the database 102. Accordingly, the response 218 returned to fulfill the request 210 may include the stored values 110 for the relational field 308 of the Accounts table 104 of the database 102. Conversely, a second request 210 that is initiated outside the local area network (e.g., an unknown public address, or a device within a different private LAN) may be determined to present a context 214 that is not permitted to access the Clients table 104, so a substitute value 304, such as a "Private" indicator, may be substituted for the values 110 of the relational field 308 in the second response 218. In this manner, each request 210 may present the same query 212—e.g., a request over the Accounts table that both are permitted to access—but the differing contexts 214 of the requests 210 may produce different responses 218.

In a third example scenario 710, the query 212 comprises a request to examine a set of people in a social network. The database 102 may comprise a table for people in the social network, as well as a relational field 306 that indicates a social group to which the respective people belong, such that the query 212 over the People table may return references to the corresponding records in the Social Groups table. However, at least some of the social groups may be private, such that the membership of people in each social group are only permitted to be exposed to other people in the same social group. It may therefore be problematic to permit a query 212 over the People table to return the values 110 stored for the relational field 308 even if the people table is not accessible; e.g., a user reviewing such a response 218 may deduce the existence of a group and the number and identities of its members simply by comparing the stored values 110, even if the Social Groups table remains inaccessible. In this example scenario 710, the context 214—i.e., the social group 712 with which the request 210 is affiliated—is related to the relational field 308 of the first table 104 of the database 102—i.e., whether the social group membership of the respective people in the People table 104 is to be revealed or withheld in the response 218 to the request 210.

Instead, and in accordance with the currently presented techniques, a first request 210 may be receive within the context 214 of a first social group 712 that is private, but not within the context of a second social group 712 that is also private. The database 102 may evaluate the request 210 according to the context 214, and may determine that social group affiliations are to be included in the response 218 only for the first social group 712 that is within the context 214. For people who are listed in the table but are affiliated with a second social group 712 that is also private and that is not within the context 214 of the first request 210, the response 218 may also identify the people, but may substitute a substitute value 304 (e.g., indicating "no group membership") for the relational field 306 for those particular records, consistent with the context 214 of the first request 210. Conversely, for a second request 210 received within the context 214 of the second social group 712 but not within the context 214 of the first social group 712, the response 218 may include the values 110 for the relational field 308 of the records of the People table 104 only where such values 110 are associated with the records of the Social Groups table 104 that involve the second social group 712, and may include a substitute value 304 for the relational field 308 where the stored value 110 indicates the first social group 712. In this manner, the substitution of the substitute values 304, based upon the context 214 of each request 210, may promote the privacy of the social groups by revealing such information only to members of the same social group, in accordance with the security policy 202 of the database 102. It is again noted that the requests 210 result in different responses 218 even though the requests 210 include the same query 212, due to accounting for the different contexts 214, wherein the context 214 is supplemental to the query 212, and wherein the context 214 pertains to the request 210. This example scenario 710 may be well-suited to the context-specific duplicate records technique as illustrated in the first example scenario 302 of FIG. 3, where the People records are duplicated and supplemented with a context field 308 (e.g., parameterized based on the requesting context 214), such that a request 210 within a particular context 214 may be fulfilled by parameterizing the query 212 according to the context 214 to retrieve the context-specific duplicate records matching the context 214 of the request 210.

Still other contexts 214 may be identified that are supplemental to the query 212, but that relate to a relational field 308 of a table 104 identified in the query 212, and that produce potentially different responses 218 even for the same query 212. For example, the contexts 214 may involve details about the requester 216 (e.g., name, role, and organizational affiliation); the request 210 (e.g., geographical or physical location, time of day, and language); a relationship with a preceding, concurrent, and/or following request 210 (e.g., a detailed response 218 may be presented for a first request 210, while a fiftieth request 210 with the same query 212 may produce a response 218 with details of the second table 104 removed); and/or details about the database 102 (e.g., requests 210 that are presented when the database 102 is under a high computational load may include null values for the relational field 308 that discourage further queries 212 over the second table 104, while requests 210 that are presented when the database 102 is under a moderate computational load may include the stored values 110 for the relational field 308 that may prompt further queries 212 over the second table 104 of the database 102).

As a second variation of this second aspect, many techniques may be utilized to determine the context 214 of a particular request 210. As a first such example, a requester 216 may include, with a request 210, additional information that is supplemental to the query 212 (e.g., identifying credentials of the requester 216, or the IP address of the device initiating the request 210), and the additional information may be analyzed to determine the context 214 of the request 210. As a second such example, the database 102 may seek additional information about a request 210, wherein the additional information is supplemental to the query 212, and wherein the additional information enables a determination of the context 214 of the request 210; e.g., a request 210 may be received from a device with a media access control (MAC) address, and the database 102 may seek information about the permissions of a user to whom such a device has been registered, where the identity and permissions of the user (presumably the requester 216 or an agent thereof) may be inferred as the context 214 of the request 210. As a third such example, the database 102 may examine other sources of information to determine the context 214 of the request 210; e.g., the database may examine the current date and time, and/or the current computational load of the system, and may utilize such information as the context 214 of the request 210. Many such scenarios may be devised that utilize a context 214, and a determination thereof, in relation to the relational field 308 of the database 102 and supplemental to the queries 212 of respective requests 210, in accordance with the techniques presented herein.

E3. Substitute Values

A third aspect that may vary among embodiments of the techniques presented herein involves the substitution of the substitute value 304 based upon the context 214 of a request 210.

As a first variation of this third aspect, the substitute value 304 may comprise a null value, such as the value zero or an empty string, which may indicate an absence of a related record 108 in the second table 104 that is identified by the relational field 306 of a record 108 of the first table 104. This variation may be helpful, e.g., for denying the existence of such a record 108 in the second table 104, where revealing the existence of the record 108 may be problematic. The use of the null value may also serve to consolidate records 108 of the first table 104 that are associated with a private record 108 of the second table 104 with records 108 of the first table 104 that are, in fact, not associated with any such record—e.g., asserting that an individual who belongs to a private social group is not assigned to any social group.

As a second variation of this third aspect, the substitute value 304 may comprise a default value. This variation may be helpful, e.g., for suggesting that the value 110 for the relational field 306 in some or all records 108 of the first table 104 has simply not been updated—e.g., that the relational field 308 of the first table 104 is simply not in use, or that no data is available for some or all records 108 of the first table 104. In contrast with the first variation, this variation provides no affirmative information about the records 108 for which the stored value 110 has been substituted with the substitute value 304.

As a third variation of this third aspect, the substitute value 304 that is substituted for a particular record 108 of the first table 104 may comprise a different value 110 of the first table 104 and/or the second table 104 than the actual stored value 110. In this variation, the records 108 of the first table 104 for which the context 214 of a request 210 is authorized to access the referenced record 108 of the second table 104 may include accurate information for the relational field 308, while the records 108 of the first table 104 for which the context 214 of the request 210 is prohibited from accessing the referenced record 108 of the second table 104 may include inaccurate and/or fictitious information.

As a fourth variation of this third aspect, the substitute value 304 may comprise a random value, which may not correlate with any record of the second table 104. Accordingly, for records 108 of the first table 104 for which the context 214 of a request 210 is authorized to access the referenced record 108 of the second table 104, a subsequent dereferencing request may yield a valid record 108 of the second table 104; and for records 108 of the first table 104 for which the context 214 of a request 210 is prohibited from accessing the referenced record 108 of the second table 104, a subsequent dereferencing request may yield a dereferencing error (e.g., no such foreign key) and/or garbage data as a result. Many such variations may be utilized in the type of substitute value 304 that is selectively substituted for the value 110 of the relational field 308, based on the context 214 of the request 210, in accordance with the techniques presented herein.

E4. Master Record Variations

A fourth aspect that may vary among embodiments of the techniques presented involves variations of a master record configuration of the database 102, such as illustrated in the second example 312 in FIG. 3. In such variations, a single record 108 is retained that is provided for requests 210 in any context 214, where a substitute value 304 is specified for a relational field 306 that references a table 104 that is not accessible in all contexts 214 of various requests 210.

In a first variation of this fourth aspect, the table 104 further comprises a context field indicating a context 214 for which the record 108 is provided. Executing the instructions further causes the database 102 to store, for the respective records, a master context value 310 in the context field 308 of records 108 from the table 104 that is provided in all contexts 214 of all requests 210. That is, the context field 308 is included in the table 104, but is set to a value that identifies any such context 214. Alternatively, a set of two or more context-specific values 310 may be provided for the context field 308, wherein each context-specific value 310 identifies, among the contexts 214 of requests 210 to access the table 104, one or more specific contexts 214 in which access this particular record 108 is authorized.

In a second variation of this fourth aspect, the table 104 stores the substitute value 304 of the relational field 306 for the respective records 108 of the table 104, thereby overwriting any previous value 110 stored for the relational field 306. Alternatively, the respective records 108 of the table 104 may maintain a stored value 110 of the record 108 for the relational field 306, and the database 102 may respond to a query for a context 214 in which access the second table 414 is not permitted by providing, in the records 108 responsive to the query 212, the substitute value 304 for the relational field 306 instead of the stored value 110. This alternative may be advantageous, e.g., by preserving the references of the records in case a future change of the security policy 202 permits all contexts 214 to access the second table 414, such that the stored value 110 is then included in the records 108 of the response 416 rather than the substitute value 304.

As a third variation of this fourth aspect, the database 102 may identify the substitute value 304 of the relational field 306 as a context-specific substitute value 304. For example, when a first request 210 is received in a first context 214, wherein the first context 214 is supplemental to a first query 212, the database 102 may provide, in the response 416, a first substitute value 304 for the relational field 306 that is suitable for the first context 214; and when a second request 210 is received in a second context 214 that is supplemental to a second query 212, the database 102 may provide, in the response 416, a second, different substitute value 304 for the relational field 306 that is suitable for the second context 214. That is, the database 102 may fulfill such requests 210 by identifying the context-specific substitute value 304 of the relational field 306 for the context 214 of the request 210, where the context 214 is supplemental to the query 212 and also relates to the relational field 306, and providing records 108 responsive to the request 210 with the context-specific substitute value 304 for the relational field 306.

As a fourth variation of this fourth aspect, the database 102 may prohibit the assignment of new values 110 to a relational field 306 for the records 108 of the table 104. For example, responsive to identifying a table 104 as comprising a field 106 that represents a relational field 306, the database server 402 may disable writes to the relational field 306 for any record 108 of the table 104, e.g., in order to preserve a substitute value 304 written there. In such variations, the database server 402 may display the relational field 306 to database administrators in a disabled visual state, and/or may completely hide the relational field 306 from presentations of the table 104 to database administrators. Many such variations of master record configurations of such databases 102 may be included in embodiments of the techniques presented herein.

E5. Duplicate Record Variations

A fifth aspect that may vary among embodiments of the presented techniques involves a duplicate record configuration of a table 104 of the database 102, such as in the first example scenario 302 of FIG. 3. In this set of embodiments, for the respective records 108 of the table 104 and the respective contexts 214 of various requests 210 to access the database 102, the database 102 may store in the table 104 a context-specific copy 314 of the record 108 that is provided in response to requests 210 in a specific context 214. For the respective contexts 214 in which access to the second table 414 is not permitted, the database 102 may store the substitute value 304 for the relational field 306 in the context-specific copy 314 of the record 108; and the database 102 may respond to a request 210 in a context 214 by providing the context-specific copies 314 of the records 108 that are responsive to the request 210.

Figure 8:
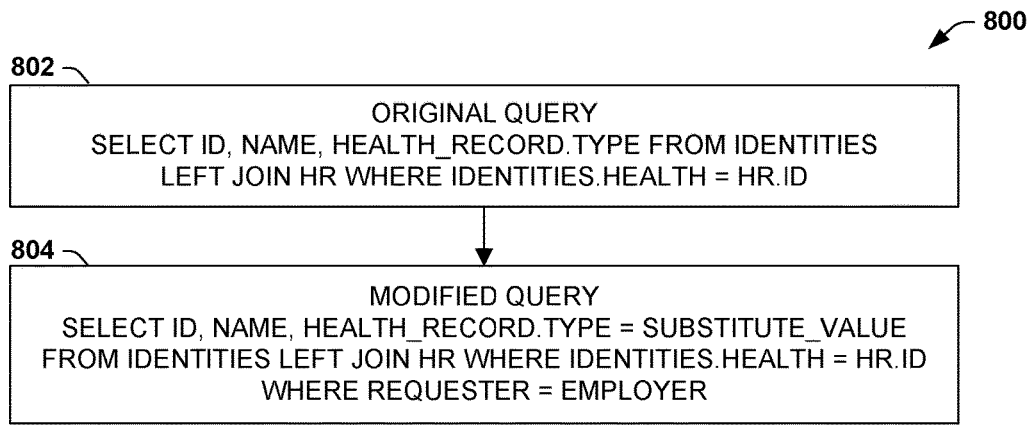
FIG. 8 is an illustration of an example scenario featuring a modification of a query for application to a database table in accordance with the techniques presented herein.

As a first variation of this fifth aspect, the database 102 may provide context-specific copies 314 of the records 108 by parameterizing the query 212 according to the context 214, and providing the context-specific copies 314 of the records 108 that are responsive to the query 212 for context 214 parameterized in the query 212. For example, in the example scenario 800 of FIG. 8, an original query 802 is parameterized with a context identifier that identifies the context 214 of the request 210, and also a substitute value 304 that is to be provided for a relational field 306 of the table 104 that corresponds to the context 214 of the request 210.

Figure 9:
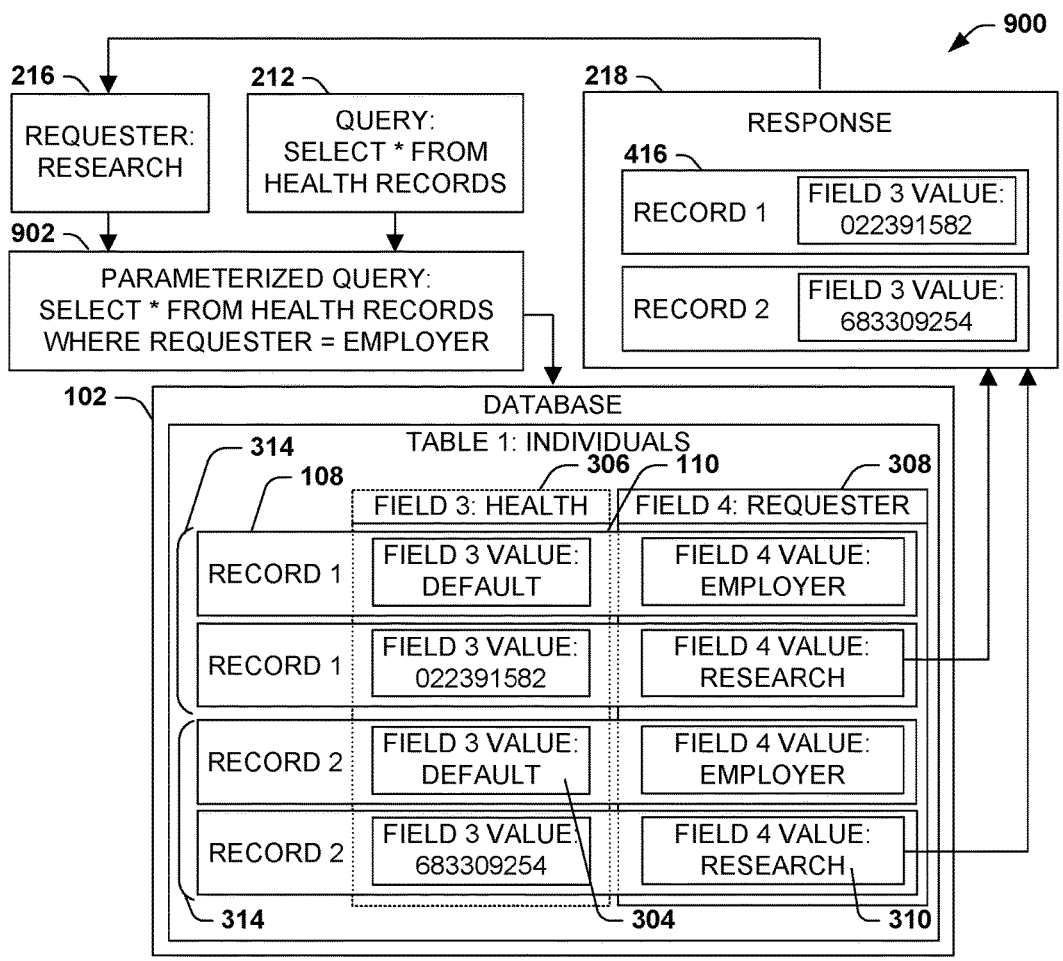
FIG. 9 is an illustration of an example scenario featuring a parameterization of a query provided in a context involving a duplicate record configuration of a database table in accordance with the techniques presented herein.

FIG. 9 presents another such example 900, wherein a query 212 is transformed into a parameterized query 902 that identifies the context 214 of the request 210, and that can be compared with the context-specific values 310 of the context field 308 of the table 104, such that the context-specific copies 314 of the respective records 108 that correspond to the respective contexts 214 of requests 210 for the records 108 are included in the response 416, along with the values 110 of the relational field 306.

As a second variation of this fifth aspect, the database server 402 may prohibit assignment of new values 110 to the relational field 306 for the context-specific copies 314 of the records 108 for respective contexts 214 of requests 210 in which the second table 414 is not accessible. Such prohibition may, e.g., preserve a substitute value 304 written into the context-specific copies 314 of the records 108.

As a third variation of this fifth aspect, various techniques may be utilized to maintain synchrony among the other fields 106 of the context-specific copies 314 of the records 108. For example, responsive to updating an updated value 110 of a non-relational field 106 of a record 108 that is represented by at least two context-specific copies 314, the database 102 may propagate the updated value 110 of the non-relational field 106 to all of the context-specific copies 314 of the same record 108.

Figure 10:
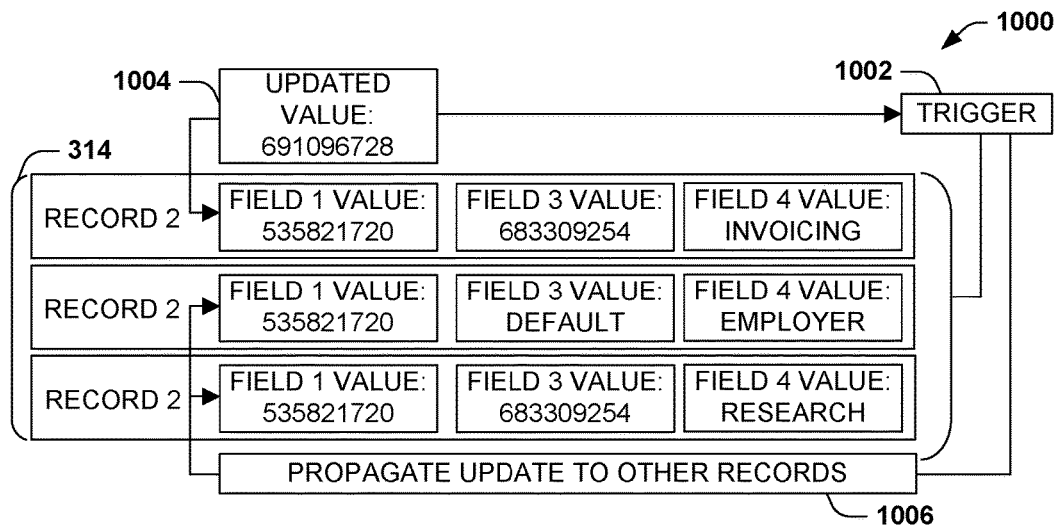
FIG. 10 is an illustration of an example scenario featuring a trigger that propagates and update of a field of a duplicate-record-configured table to the other context-specific copies of the table in accordance with the techniques presented herein.

FIG. 10 presents an illustration of an example scenario 1000 featuring one such variation, in which an update trigger 1002 is associated with the context-specific copies 314 of the records 108 in order to propagate updates. By associating the update trigger 1002 with the context-specific copies 314, the database 102 propagates an updated value 1004 by detecting an invocation of the update trigger 1002 that indicates the writing of an updated value 1004 of the non-relational field 106 of one context-specific copy 314 of the record 108. The database 102 then propagates 1006 the updated value 1004 for the non-relational field 106 to all context-specific copies 314 of the same record 108.

Figure 11:
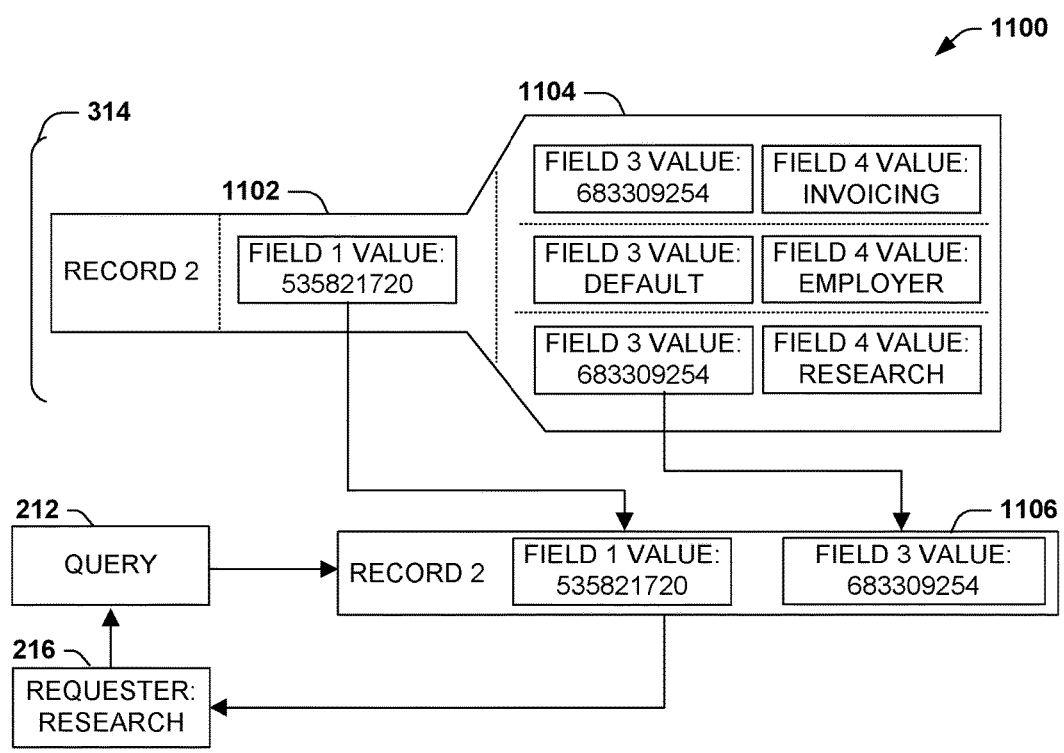
FIG. 11 is an illustration of an example scenario featuring a representation of a record in a duplicate-record configuration of a database table in accordance with the techniques presented herein.

As a fourth variation of this fifth aspect, the database 102 may store context-specific copies 314 in various ways. It may be appreciated that although duplicating respective records 108 into context-specific copies 314 may promote the performance of query fulfillment on a table 104 (e.g., by reducing the logical complexity of query processing), such duplication may also consume significant storage resources; e.g., duplicating a 1,000,000-record database 102 to serve forty contexts 214 causes the corresponding table 104 to grow to 40,000,000 records 108. FIG. 11 presents an illustration of an example scenario 1100 featuring a variation that may reduce such storage complexity, wherein the duplicated record 108 is partitioned into a non-protected portion 1102 that is stored once, and a portion 1104 comprising the relational field 306 and the context field 308 that identifies the context 214 of the requests 210 that are associated with each context-specific copy 314. The record 108 is stored as one copy of the non-protected portion 1102 of the record 108, and context-specific copies 314 of the relational field 306 for the respective contexts 214. The database 102 provides the record 108 responsive to a request 210 in a particular context 214 by aggregating 1106 the one copy of the non-protected portion 1102 of the record 108 and the context-specific copy 314 of the relational field 306 for the context 214 of the request 210. Many such variations may be included in duplicate-record configurations of the techniques presented herein.

E6. Database Configuration

A sixth aspect that may vary among embodiments of the techniques presented herein is the representation of the configuration of the database 102 to specify the use and details of the implementation of such techniques. That is, the techniques presented herein may be selected for a particular database 102 as a set of configuration options, which the database 102 may utilize during various stages of design, population, updating, and accessing of the database 102.

As a first variation of this sixth aspect, the configuration of the database 102 may indicate, for respective relational fields 306 and/or tables 104, an access mode. Such access modes may be selected from an access mode set comprising, e.g., a single-record master context access mode (such as the second example 312 of FIG. 3) and/or a duplicate-record access mode (such as the first example scenario 302 of FIG. 3). Responsive to a configuration selection of an access mode for a relational field 306 of a table 104, the database may store and apply, in its configuration, the access mode for the relational field 306 of the table 104.

As a second variation of this sixth aspect, the database 102 may store, within the configuration, a template set comprising at least one template that respectively identify the access mode for the respective relational fields 306 of respective tables 104 of the database 102. Responsive to a selection of a selected template of the template set, the database 102 select and apply the access modes for the respective relational fields 306 of respective tables 104 of the database 102 according to the selected template.

As a third variation of this sixth aspect, the database 102 may limit some configuration options to tables 104 that satisfy certain conditions, access mode conditions, and may store the access mode for the relational fields 306 in the database configuration only after verifying that the selected table 104 satisfies the access mode condition of the access mode. As a first such example, the access mode condition for the duplicate-record access mode may comprise a maximum table size of the table 104 to which the duplicate-record access mode is selected. As a second such example, the access mode condition for the duplicate-record access mode may comprise a restriction that prohibits application of a duplicate-record access mode of a table that is referenced by a table 104 configured with a single-record master context access mode. It may be appreciated that the difficulty of adapting a single master record (which is utilized in any context 214) to reference a second table 414 storing context-specific copies 314 (where the selection of the associated records 108 depends upon the context 214 of the request 210) may create undesirable configuration complexity. Many such variations may be included in embodiments of the techniques presented herein.

F. Computing Environment

Figure 12:
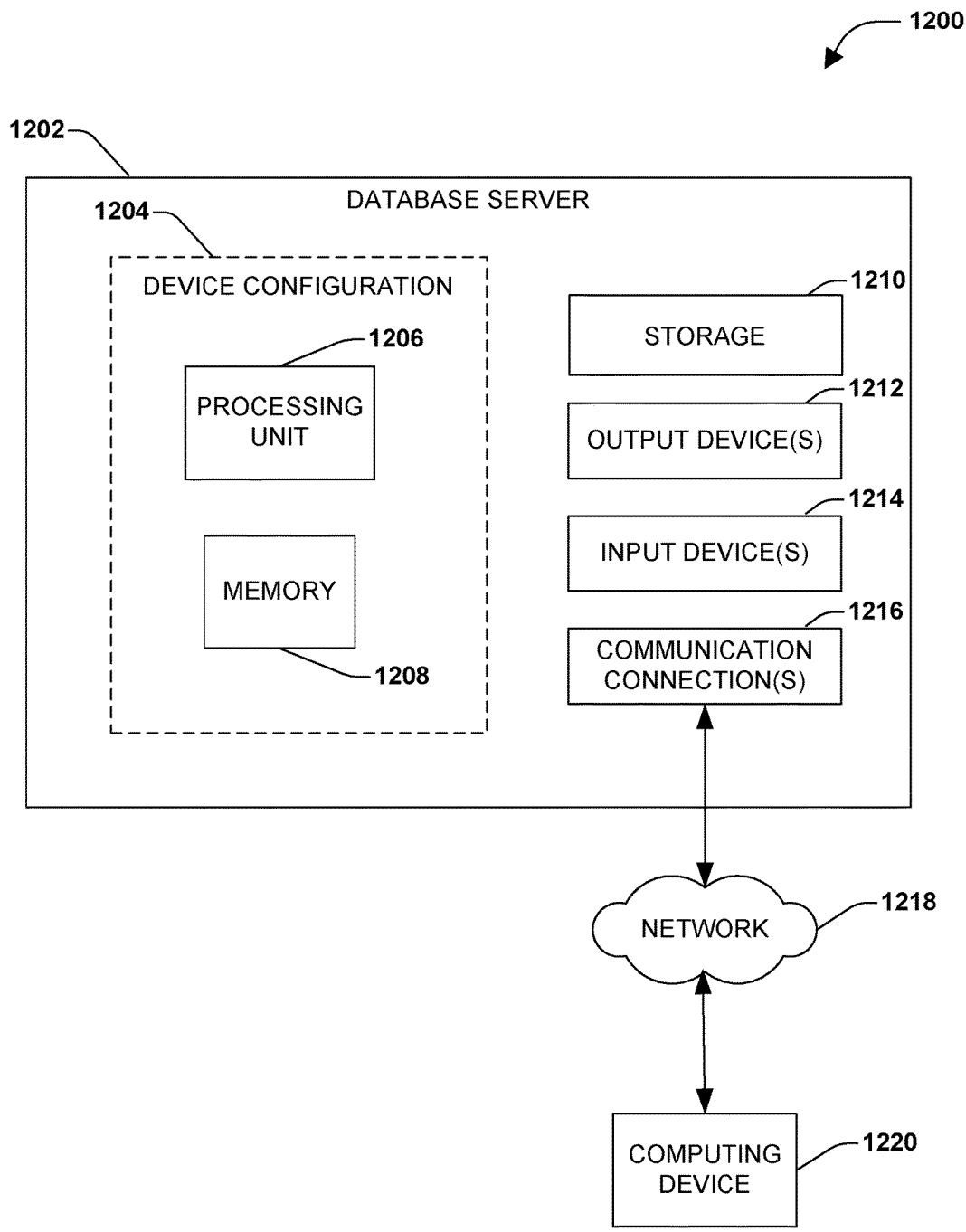
FIG. 12 is an illustration of an example computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1200 comprising a computing device 1202 configured to implement one or more embodiments provided herein. In one configuration, computing device 1202 includes at least one processing unit 1206 and memory 1208. Depending on the exact configuration and type of computing device, memory 1208 may be volatile (such as RAM, for example), non-volatile (such as ROM, flash memory, etc., for example) or some combination of the two. This configuration is illustrated in FIG. 12 by dashed line 1204.

In other embodiments, device 1202 may include additional features and/or functionality. For example, device 1202 may also include additional storage (e.g., removable and/or non-removable) including, but not limited to, magnetic storage, optical storage, and the like. Such additional storage is illustrated in FIG. 12 by storage 1210. In one embodiment, computer readable instructions to implement one or more embodiments provided herein may be in storage 1210. Storage 1210 may also store other computer readable instructions to implement an operating system, an application program, and the like. Computer readable instructions may be loaded in memory 1208 for execution by processing unit 1206, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1208 and storage 1210 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1202 may also include communication connections 1216 that allows device 1202 to communicate with other devices. Communication connections 1216 may include, but is not limited to, a modem, a Network Interface Card (NIC), an integrated network interface, a radio frequency transmitter/receiver, an infrared port, a USB connection, or other interfaces for connecting computing device 1202 to other computing devices. Communication connections 1216 may include a wired connection or a wireless connection. Communication connections 1216 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1202 may include input devices 1214 such as keyboard, mouse, pen, voice input device, touch input device, infrared cameras, video input devices, and/or any other input device. Output devices 1212 such as one or more displays, speakers, printers, and/or any other output device may also be included in device 1202. Input devices 1214 and output devices 1212 may be connected to device 1202 via a wired connection, wireless connection, or any combination thereof. In one embodiment, an input device or an output device from another computing device may be used as input devices 1214 or output devices 1212 for computing device 1202.

Components of computing device 1202 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1202 may be interconnected by a network. For example, memory 1208 may be comprised of multiple physical memory units located in different physical locations interconnected by a network.

Those skilled in the art will realize that storage devices utilized to store computer readable instructions may be distributed across a network. For example, a computing device 1220 accessible via network 1218 may store computer readable instructions to implement one or more embodiments provided herein. Computing device 1202 may access computing device 1220 and download a part or all of the computer readable instructions for execution. Alternatively, computing device 1202 may download pieces of the computer readable instructions, as needed, or some instructions may be executed at computing device 1202 and some at computing device 1220.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system that provides access to a database comprising a first table comprising a relational field comprising values that reference records of a second table of the database, the system comprising:
    a processor; and
    a memory storing instructions that, when executed by the processor, cause the system to:
        receive a request comprising a query to select a record of the first table, where the record includes, for the relational field, a value that references a record of the second table;
        identify a context of the request, wherein the context is supplemental to the query;
        determine that the context of the request is not associated with access to the second table;
        in response to the determination that the context of the request is not associated with access to the second table, generate a response that substitutes, for the value that references the record of the second table, a substitute value that does not reference any record of the second table; and
        providing the response in response to the request.

2. The system of claim 1, wherein the instructions, when executed by the processor, cause the system to:
    for contexts of respective requests, identify a context-specific substitute value for the relational field when requested in the context; and wherein
    providing of the record further comprises: responsive to a request in a context in which access to the second table is not permitted:
        identification of the context-specific substitute value of the relational field for the context of the request; and
        provision of the record responsive to the query with the context-specific substitute value for the relational field.

3. The system of claim 1, wherein identification of the substitute value further comprises:
    for a particular context, storing, in the table, a context-specific copy of the record that is provided for requests in the particular context, and
    for respective contexts that are not permitted to access the second table, storing the substitute value for the relational field in the context-specific copy of the record; and
    providing the records further comprises: responsive to a request in a specific context, provide the context-specific copies of the record that is responsive to the query and for the specific context of the request.

4. The system of claim 3, wherein the instructions, when executed by the processor, cause the system to:

responsive to updating an updated value of a non-relational field of the record represented by at least two context-specific copies, propagate the updated value of the non-relational field to all context-specific copies of the record.

5. The system of claim 3, wherein storage of the context-specific copy of the record further comprises:
partitioning the record into a non-protected portion and the relational field; and
storing the record as:
one copy of the non-protected portion of the record, and
context-specific copies of the relational field for the respective contexts; and
providing the records further comprises: responsive to receiving a request in a selected context, for the respective records that are responsive to the query, providing:
the one copy of the non-protected portion of the record; and
the context-specific copy of the relational field according to the selected context of the request.

6. The system of claim 5, wherein:
respective access modes are applicable only to tables that satisfy at least one access mode condition; and
storage of the access mode further comprises: responsive to the configuration selection of the access mode, storage of the access mode for the relational field in the database configuration only after verifying that the table satisfies the access mode condition of the access mode.

7. The system of claim 1, wherein the instructions, when executed by the processor, cause the system to:
indicate an access mode for the relational field, wherein the access mode is selected from an access mode set comprising:
a single-record master context access mode, and
a duplicate-record access mode; and
based on a configuration selection of an access mode for a relational field of a table, store, in a configuration of the database, the access mode for the relational field of the table.

8. A computer-readable storage medium storing instructions that cause a system to provide access to a database comprising a first table comprising a relational field comprising values that reference records of a second table of the database, by:
receiving a request comprising a query to select a record of the first table, where the record includes, for the relational field, a value that references a record of the second table;
identifying a context of the request, wherein the context is supplemental to the query;
determine that the context of the request is not associated with access to the second table;
in response to the determination that the context of the request is not associated with access to the second table, generating a response that substitutes, for the value that references the record of the second table, a substitute value that does not reference any record of the second table; and
providing the response in response to the request.

9. The computer-readable storage medium of claim 8, wherein the instructions further cause the system to:
for contexts of respective requests, identify a context-specific substitute value for the relational field when requested in the context; and wherein providing of the record further comprises: responsive to a request in a context in which access to the second table is not permitted:
identification of the context-specific substitute value of the relational field for the context of the request; and
provision of the record responsive to the query with the context-specific substitute value for the relational field.

10. The computer-readable storage medium of claim 8, wherein identification of the substitute value further comprises:
for a particular context, storing, in the table, a context-specific copy of the record that is provided for requests in the particular context, and
for respective contexts that are not permitted to access the second table, storing the substitute value for the relational field in the context-specific copy of the record; and
providing the records further comprises: responsive to a request in a specific context, provide the context-specific copies of the record that is responsive to the query and for the specific context of the request.

11. The computer-readable storage medium of claim 10, wherein the instructions further cause the system to:
responsive to updating an updated value of a non-relational field of the record represented by at least two context-specific copies, propagate the updated value of the non-relational field to all context-specific copies of the record.

12. The computer-readable storage medium of claim 10, wherein storage of the context-specific copy of the record further comprises:
partitioning the record into a non-protected portion and the relational field; and
storing the record as:
one copy of the non-protected portion of the record, and
context-specific copies of the relational field for the respective contexts; and
providing the records further comprises: responsive to receiving a request in a selected context, for the respective records that are responsive to the query, providing:
the one copy of the non-protected portion of the record; and
the context-specific copy of the relational field according to the selected context of the request.

13. The computer-readable storage medium of claim 8, wherein the instructions further cause the system to:
indicate an access mode for the relational field, wherein the access mode is selected from an access mode set comprising:
a single-record master context access mode, and
a duplicate-record access mode; and
based on a configuration selection of an access mode for a relational field of a table, store, in a configuration of the database, the access mode for the relational field of the table.

14. A method of providing access to a database comprising a first table comprising a relational field comprising values that reference records of a second table of the database, by:
receiving a request comprising a query to select a record of the first table, where the record includes, for the relational field, a value that references a record of the second table;
identifying a context of the request, wherein the context is supplemental to the query;

determining that the context of the request is not associated with access to the second table;

in response to the determination that the context of the request is not associated with access to the second table, generating a response that substitutes, for the value that references the record of the second table, a substitute value that does not reference any record of the second table; and providing the response in response to the request.

15. The method of claim 14, wherein:

the method further comprises: for contexts of respective requests, identifying a context-specific substitute value for the relational field when requested in the context; and providing the record further comprises: responsive to a request in a context in which access to the second table is not permitted:

identify the context-specific substitute value of the relational field for the context of the request; and provide the record responsive to the query with the context-specific substitute value for the relational field.

16. The method of claim 14, wherein:

identifying the substitute value further comprises:

for a particular context, storing, in the table, a context-specific copy of the record that is provided for requests in the particular context, and for respective contexts that are not permitted to access the second table, storing the substitute value for the relational field in the context-specific copy of the record; and providing the records further comprises: responsive to a request in a specific context, provide the context-specific copies of the record that is responsive to the query and for the specific context of the request.

17. The method of claim 16, further comprising: responsive to updating an updated value of a non-relational field of the record represented by at least two context-specific copies, propagating the updated value of the non-relational field to all context-specific copies of the record.

18. The method of claim 16, wherein:

storing the context-specific copy of the record further comprises:

partitioning the record into a non-protected portion and the relational field; and storing the record as:

one copy of the non-protected portion of the record, and context-specific copies of the relational field for the respective contexts; and providing the records further comprises: responsive to receiving a request in a selected context, for the respective records that are responsive to the query, provide:

the one copy of the non-protected portion of the record; and the context-specific copy of the relational field according of the selected context of the request.

19. The method of claim 18, wherein:

respective access modes are applicable only to tables that satisfy at least one access mode condition; and storing the access mode further comprises: responsive to the configuration selection of the access mode, store the access mode for the relational field in the database configuration only after verifying that the table satisfies the access mode condition of the access mode.

20. The method of claim 14, further comprising:

indicating an access mode for the relational field, wherein the access mode is selected from an access mode set comprising:

a single-record master context access mode, and a duplicate-record access mode; and based on a configuration selection of an access mode for a relational field of a table, storing, in a configuration of the database, the access mode for the relational field of the table.

* * * * *